(12) United States Patent
Lin

(10) Patent No.: US 7,770,932 B2
(45) Date of Patent: Aug. 10, 2010

(54) TANK HOLDING FRAME

(75) Inventor: Chuang-Hsiung Lin, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 162 days.

(21) Appl. No.: 12/194,295

(22) Filed: Aug. 19, 2008

(65) Prior Publication Data

US 2009/0058140 A1 Mar. 5, 2009

(30) Foreign Application Priority Data

Aug. 31, 2007 (TW) .............................. 96132473 A

(51) Int. Cl.
*B60K 15/07* (2006.01)
(52) U.S. Cl. ..................................................... 280/834
(58) Field of Classification Search ................. 280/830, 280/834
See application file for complete search history.

(56) References Cited

U.S. PATENT DOCUMENTS

| 5,366,246 | A | * | 11/1994 | Chen et al. | ................... | 280/834 |
| 5,380,042 | A | * | 1/1995 | Hively et al. | ................ | 280/834 |
| 5,673,940 | A | * | 10/1997 | Gaisford et al. | ............. | 280/834 |
| 2009/0206588 | A1 | * | 8/2009 | Shaw | ......................... | 280/755 |

* cited by examiner

*Primary Examiner*—Kevin Hurley
(74) *Attorney, Agent, or Firm*—Vedder Price, P.C.

(57) ABSTRACT

A tank holding frame for a vehicle body includes front and rear beams connected to the vehicle body, a first beam connected to the vehicle body and the front beam, a second beam connected removably to the vehicle body, and a guard member having at least one end connected removably to a respective one of the first and second beams. A fuel tank is removable from a tank holding space cooperatively defined by the front, rear, first, second beams, the guard member, and the vehicle body when the second beam and the guard member are detached from the tank holding frame.

10 Claims, 6 Drawing Sheets

US 7,770,932 B2

TANK HOLDING FRAME

CROSS-REFERENCE TO RELATED APPLICATION

This application claims priority of Taiwanese application no. 096132473, filed on Aug. 31, 2007.

BACKGROUND OF THE INVENTION

1. Field of the Invention

This invention relates to a tank holding frame, more particularly to a tank holding frame adapted for use on a vehicle body so as to retain a fuel tank therein, while ensuring that the fuel tank can be conveniently removed.

2. Description of the Related Art

FIGS. 1 to 3 illustrate a conventional vehicle body 1 that can be found on a golf cart or on an industrial forklift. The vehicle body 1 has left and right frame members 12, 11 spaced apart from each other, a connecting bar 13 that interconnects bottom sides of the left and right frame members 12, 11, a reinforcing bar 14 disposed above the connecting bar 13 and interconnecting the left and right frame members 12, 11, a front frame member 15 connected to the connecting bar 13 and the reinforcing bar 14, a bottom frame member 16 connected to the connecting bar 13, an upper frame member 17 supported on the bottom frame member 16 and connected to the left and right frame members 12, 11, and a tank holding frame 18 disposed adjacent to the left frame member 12 for retaining a fuel tank 100 therein.

The left frame member 12 has a first bar section 121 that extends in a front-to-rear direction. The bottom frame member 16 has a second bar section 161 that extends in the front-to-rear direction and that is spaced apart from the first bar section 121 in a left-to-right direction. The upper frame member 17 has an upper bar section 171 that extends in the left-to-right direction and that is disposed above rear segments of the first and second bar sections 121, 161. The tank holding frame 18 includes front, first, second, and rear beams 181, 182, 184, 183, and a guard member 185.

The front beam 181 is disposed to extend in the left-to-right direction and has opposite ends welded to front segments of the first and second bar sections 121, 161 such that the front beam 181 is spaced apart from the upper bar section 171 in the front-to-rear direction. The first beam 182 includes a first beam segment 1821 that extends in the front-to-rear direction and that has front and rear ends, and a second beam segment 1822 that extends downwardly from the front end of the first beam segment 1821. The first beam 182 is disposed adjacent to the left frame member 12. The rear end of the first beam segment 1821 is welded to the upper bar section 171. The second beam segment 1822 has one end distal from the first beam segment 1821 and welded to the front beam 181. The second beam 184 includes a third beam segment 1841 that extends in the front-to-rear direction and that has front and rear ends, and a fourth beam segment 1842 that extends downwardly from the front end of the third beam segment 1841. The second beam 184 is spaced apart from the first beam 182 in the left-to-right direction. The rear end of the third beam segment 1841 is welded to the upper bar section 171. The fourth beam segment 1842 has one end distal from the third beam segment 1841 and welded to the second bar section 161. The rear beam 183 includes an upright beam segment 1831 that has upper and lower ends, and a horizontal beam segment 1832 that extends from the lower end of the upright beam segment 1831. The rear beam 183 is spaced apart from the front beam 181 in the front-to-rear direction. The upper end of the upright beam segment 1831 is welded to the first beam segment 1821 of the first beam 182. The horizontal beam segment 1832 has one end distal from the upright beam segment 1831 and welded to the second bar section 161. The guard member 185 is disposed above the front beam 181, extends in the left-to-right direction, and has opposite ends connected to the first and second beams 182, 184 respectively, by means of screws. The front, rear, first, and second beams 181, 183, 182, 184, and the guard member 185 are adapted to cooperate with the second bar section 161 and the upper bar section 171 of the vehicle body 1 to define a tank holding space for holding the fuel tank 100 therein. The fuel tank 100 has a tank body 101 made of plastic to reduce the load borne by the tank holding frame 18. Because the strength of plastic is relatively weak, replacement of the fuel tank 100 is unavoidable since the tank body 101 is prone to damage. The guard member 185 is disconnected from the first and second beams 182, 184 when it is desired to replace the fuel tank 100. However, since the front, first, rear, and second beams 181, 182, 183, 184, are welded to the vehicle body 1, and due to presence of a fuel inlet pipe 102 on the tank body 101, the front end of the fuel tank 100 must be lifted upward (as indicated by the arrow 103 in FIG. 3) and then pulled forward (as indicated by the arrow 104 in FIG. 3) such that the fuel tank 100 is tilted awkwardly at an angle in order to remove the fuel tank 100 from the tank holding space without interference between the fuel inlet pipe 102 and the upper bar section 171, which makes the removal operation troublesome and inconvenient.

SUMMARY OF THE INVENTION

Therefore, an object of the present invention is to provide a tank holding frame that is capable of overcoming the above-mentioned drawback of the prior art.

According to the present invention, a tank holding frame is adapted for use on a vehicle body so as to retain a fuel tank removably therein. The vehicle body has a first bar section that extends in a front-to-rear direction, a second bar section that extends in the front-to-rear direction and that is spaced apart from the first bar section in a left-to-right direction, and an upper bar section that extends in the left-to-right direction and that is disposed above rear segments of the first and second bar sections. The tank holding frame includes a front beam, a first beam, a second beam, a rear beam, and a guard member.

The front beam is disposed to extend in the left-to-right direction and has opposite ends adapted to be connected to front segments of the first and second bar sections such that the front beam is spaced apart from the upper bar section in the front-to-rear direction. The first beam includes a first beam segment that extends in the front-to-rear direction and that has front and rear ends, and a second beam segment that extends downwardly from the front end of the first beam segment. The first beam is adapted to be disposed adjacent to the first bar section. The rear end of the first beam segment is adapted to be connected to the upper bar section. The second beam segment has one end distal from the first beam segment and connected to the front beam. The second beam includes a third beam segment that extends in the front-to-rear direction and that has front and rear ends, and a fourth beam segment that extends downwardly from the front end of the third beam segment. The second beam is spaced apart from the first beam in the left-to-right direction. The rear end of the third beam segment is adapted to be connected removably to the upper bar section. The fourth beam segment has one end distal from the third beam segment and adapted to be connected removably to the second bar section. The rear beam includes an upright beam segment that has upper and lower ends, and a horizontal beam segment that extends from the lower end of the upright beam segment. The rear beam is spaced apart from the front beam in the front-to-rear direction. The upper end of the upright beam segment is connected to the first beam. The horizontal beam segment has one end distal from the upright beam segment and adapted to be connected to the second bar section. The guard member is disposed above the front beam, extends in the left-to-right direction, and has opposite ends, each of which is adjacent to a respective one of the first and second beams. In addition, at least one of the opposite ends of the guard member is connected removably to the respective one of the first and second beams. The front, rear, first, and second beams, and the guard member are adapted to cooperate with the second bar section and the upper bar section of the vehicle body to define a tank holding space adapted for holding the fuel tank therein. The fuel tank is removable from the tank holding space when the second beam and the guard member are detached from the tank holding frame.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
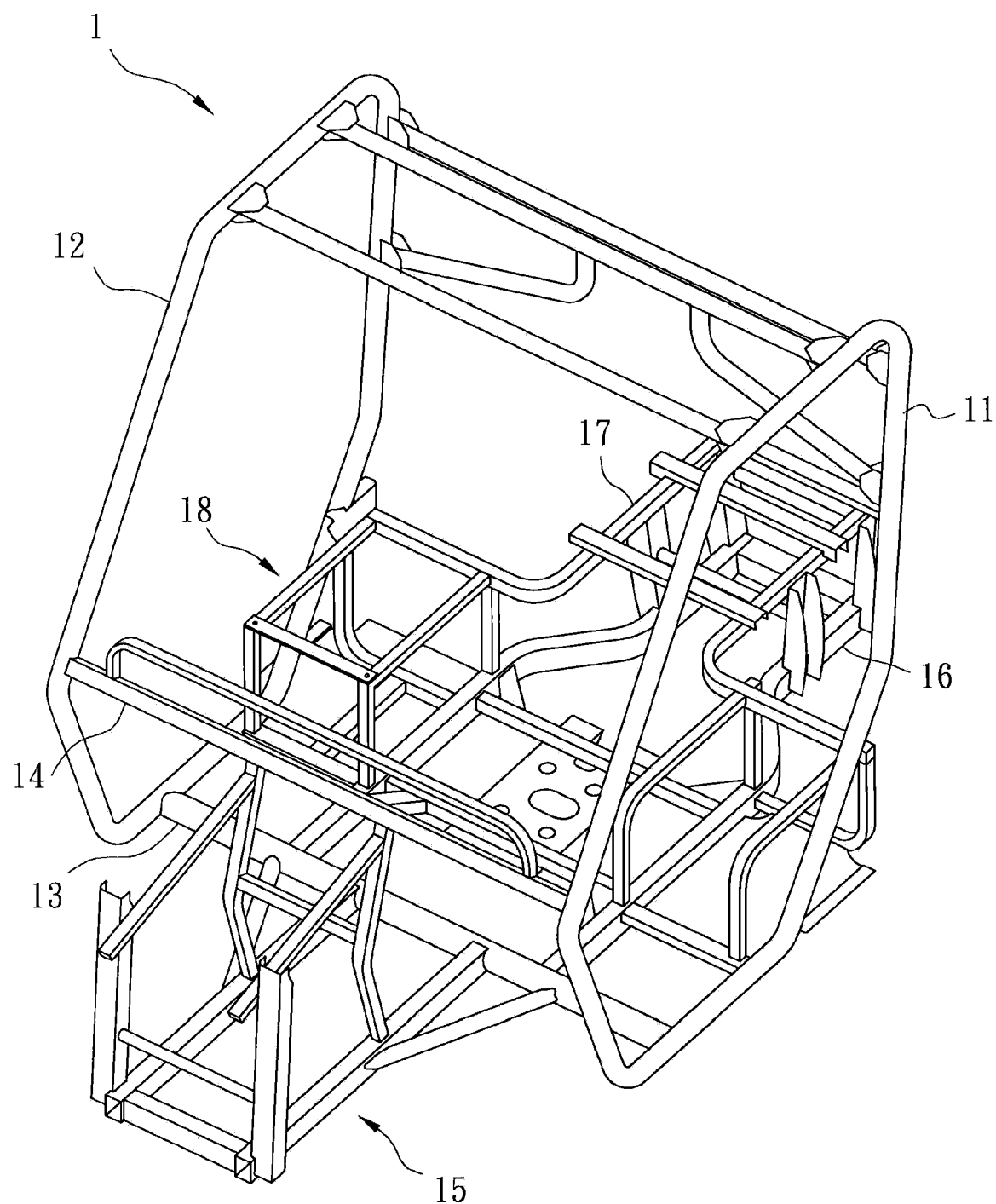
FIG. 1 is a perspective view of a vehicle body installed with a conventional tank holding frame.
Figure 2:
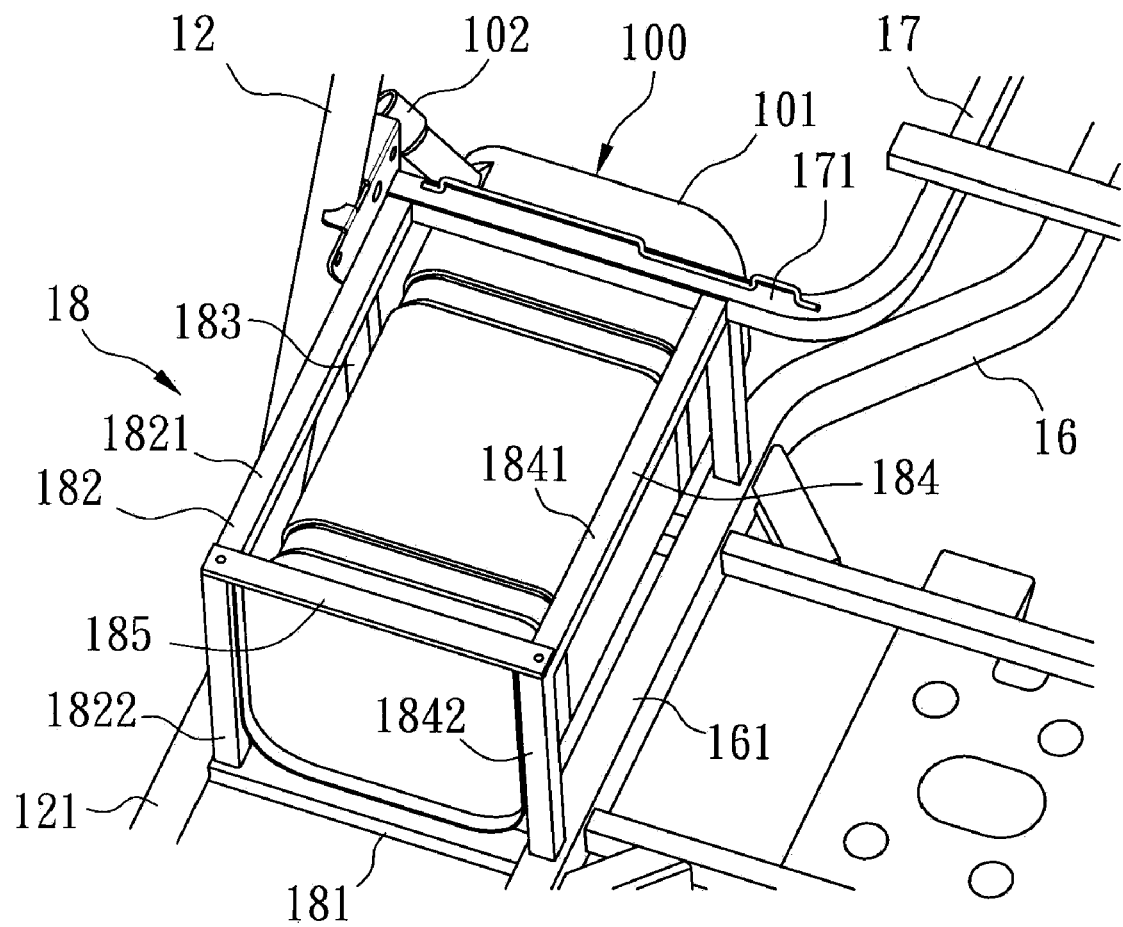
FIG. 2 shows a perspective view of the conventional tank holding frame that retains a fuel tank therein.
Figure 3:
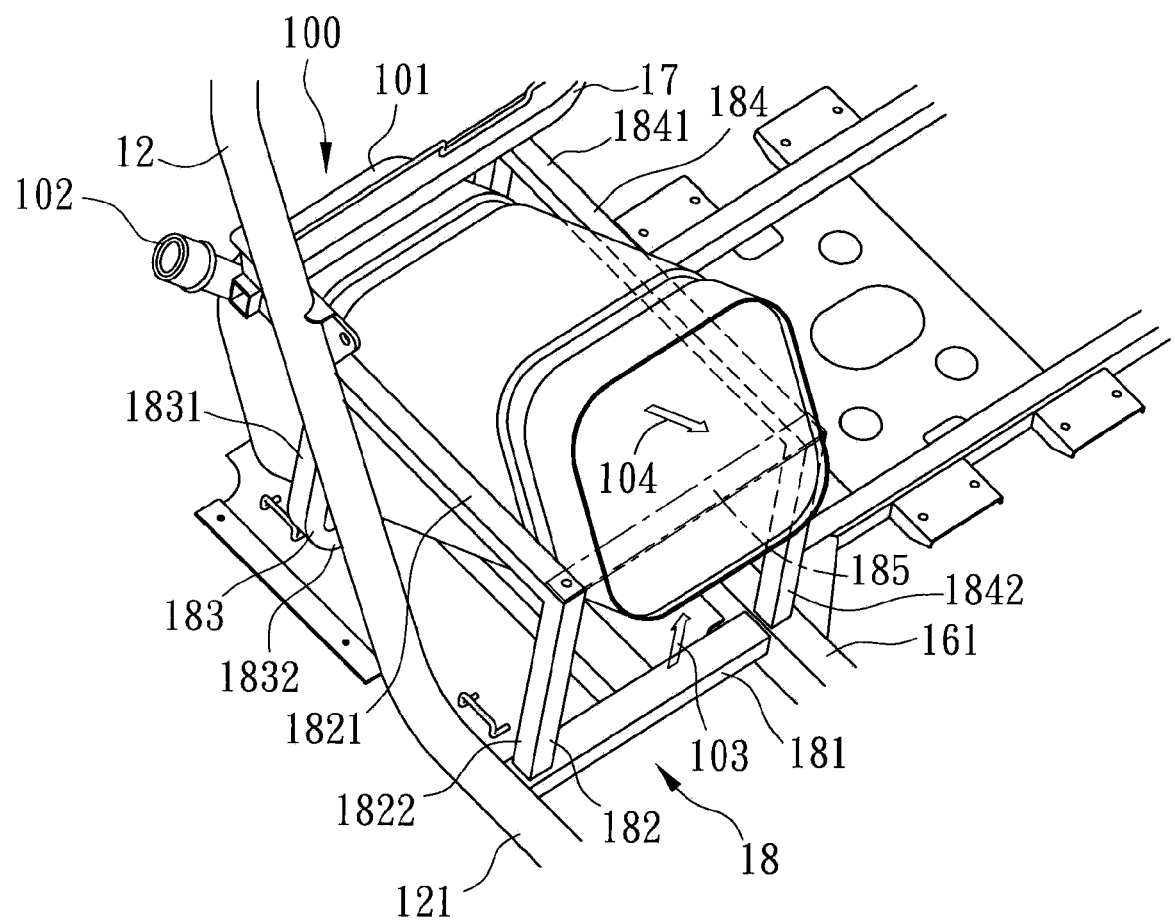
FIG. 3 is a perspective view to illustrate how the fuel tank is removed from the conventional tank holding frame.
Figure 4:
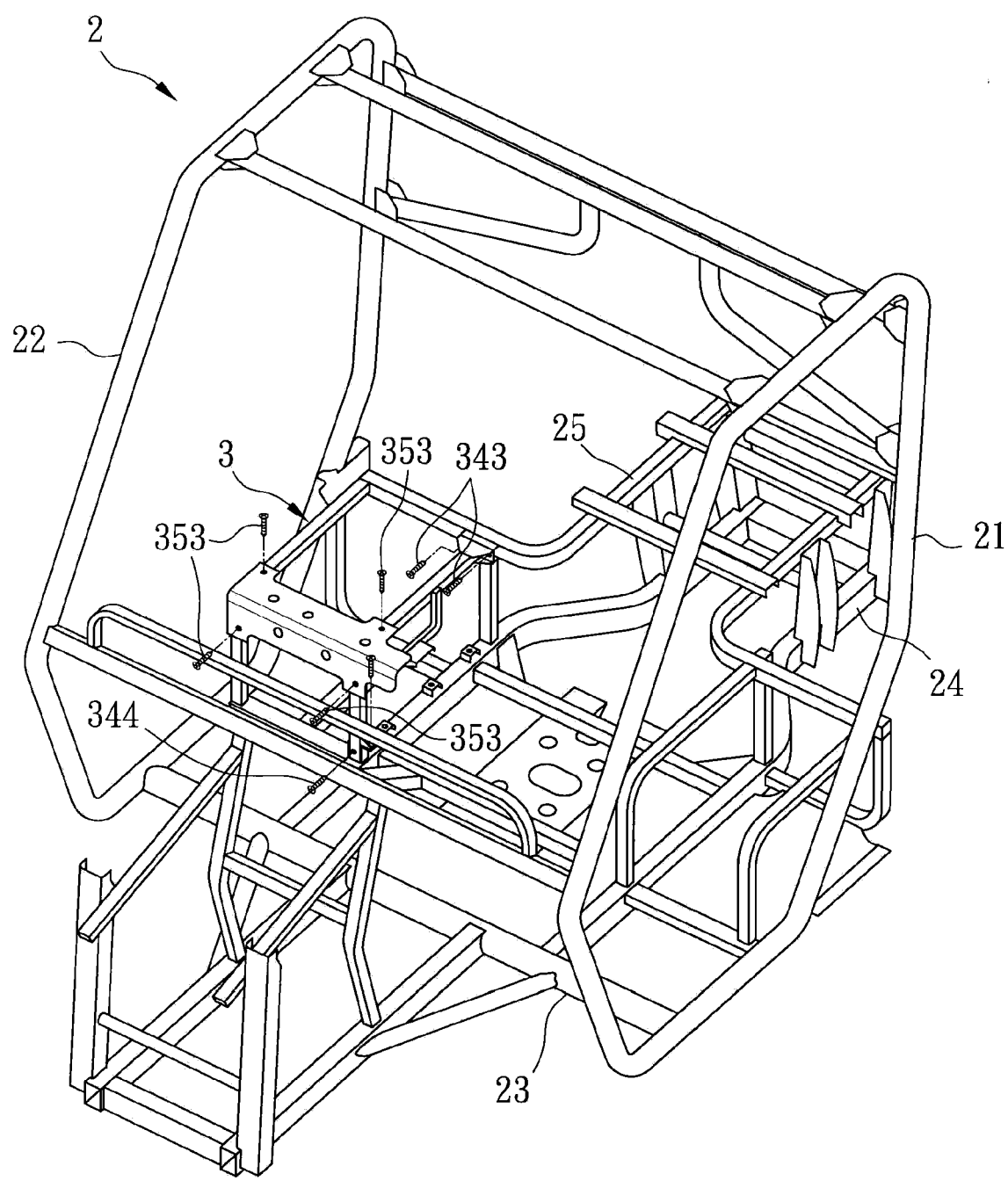
FIG. 4 is a perspective view of a vehicle body installed with the preferred embodiment of a tank holding frame according to the present invention.
Figure 5:
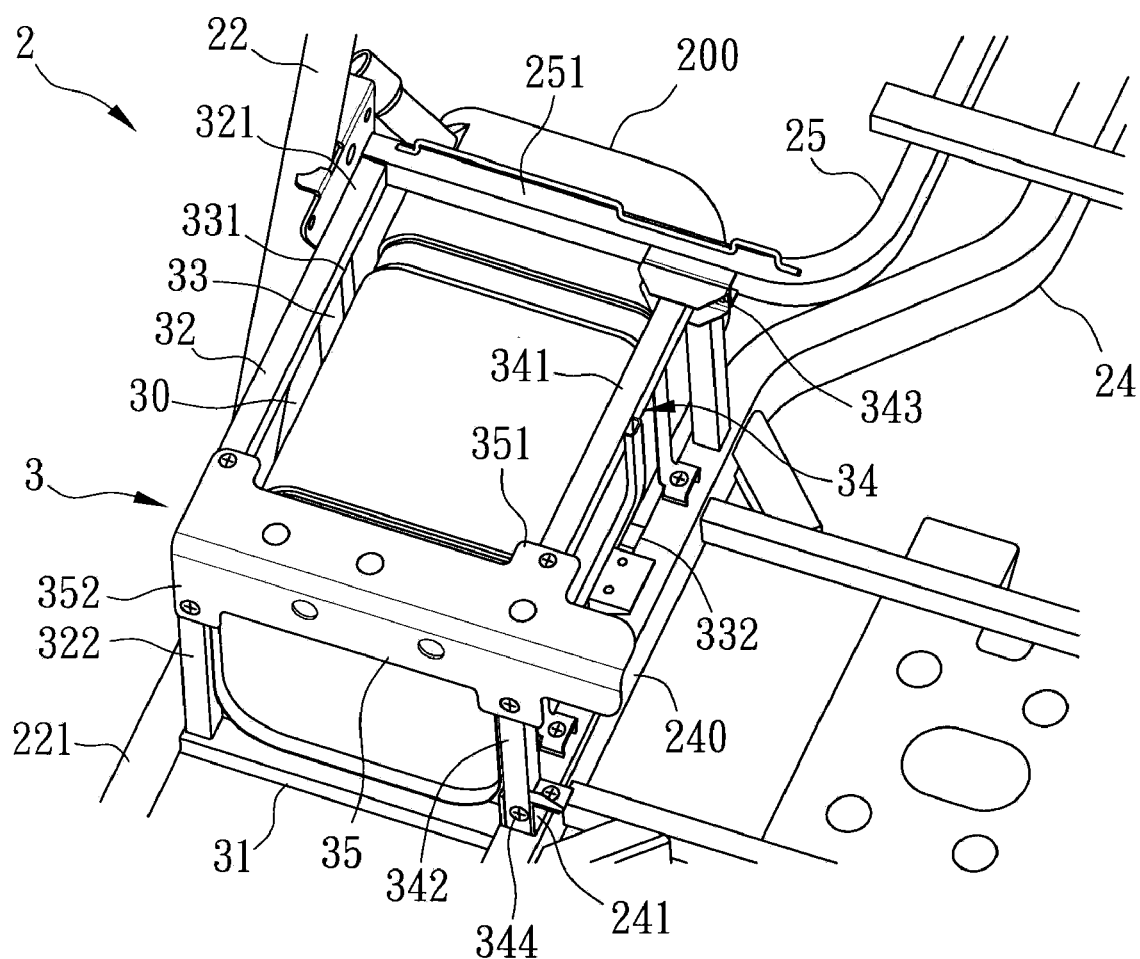
FIG. 5 shows a perspective view of the tank holding frame of this invention that retains a fuel tank therein.
Figure 6:
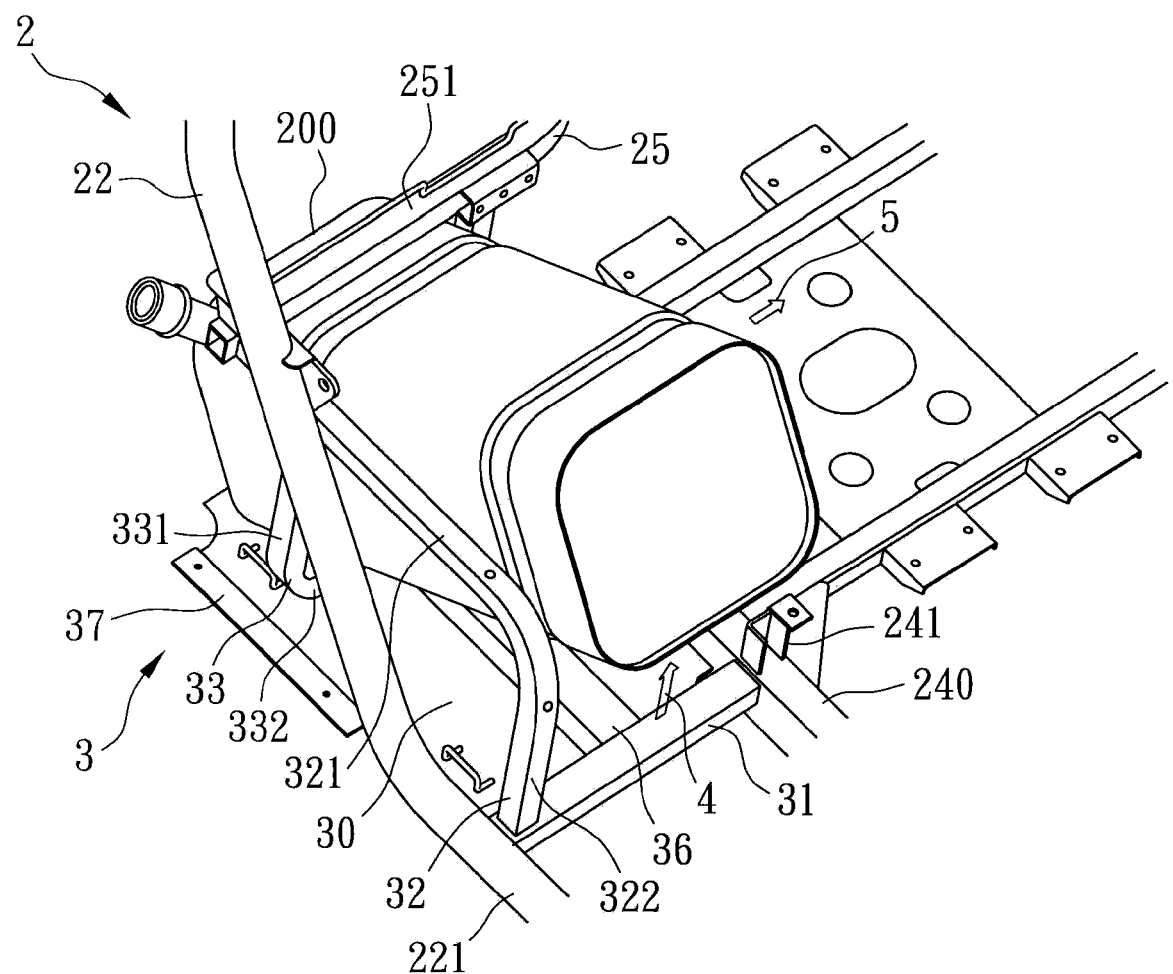
FIG. 6 is a perspective view to illustrate how the fuel tank is removed from the tank holding frame of this invention.

The preferred embodiment of a tank holding frame of the present invention is illustrated in FIGS. 4 to 6. The tank holding frame 3 is adapted for use on a vehicle body 2 so as to retain a fuel tank 200 removably therein. The vehicle body 2 has left and right frame members 22, 21 spaced apart from each other, a connecting bar 23 that interconnects bottom sides of the left and right frame members 22, 21, a bottom frame member 24 connected to the connecting bar 23, and an upper frame member 25 supported on the bottom frame member 24 and connected to the left and right frame members 22, 21. The left frame member 22 has a first bar section 221 that extends in a front-to-rear direction. The bottom frame member 24 has a second bar section 240 that extends in the front-to-rear direction and that is spaced apart from the first bar section 221 in a left-to-right direction. The upper frame member 25 has an upper bar section 251 that extends in the left-to-right direction and that is disposed above rear segments of the first and second bar sections 221, 240. The tank holding frame 3 includes a front beam 31, a first beam 32, a second beam 34, a rear beam 33, a guard member 35, a reinforcing beam 36, a cover 37, a fixing component 241, screw fasteners 343, and a screw member 344. The front beam 31 is disposed to extend in the left-to-right direction and has opposite ends adapted to be connected to front segments of the first and second bar sections 221, 240 such that the front beam 31 is spaced apart from the upper bar section 251 in the front-to-rear direction. The first beam 32 includes a first beam segment 321 that extends in the front-to-rear direction and that has front and rear ends, and a second beam segment 322 that extends downwardly from the front end of the first beam segment 321. The first beam 32 is adapted to be disposed adjacent to the first bar section 221 of the left frame member 22. The rear end of the first beam segment 321 is adapted to be connected to the upper bar section 251. The second beam segment 322 has one end distal from the first beam segment 321 and connected to the front beam 31. The second beam 34 includes a third beam segment 341 that extends in the front-to-rear direction and that has front and rear ends, and a fourth beam segment 342 that extends downwardly from the front end of the third beam segment 341. The second beam 34 is spaced apart from the first beam 32 in the left-to-right direction. The rear end of the third beam segment 341 is adapted to be connected removably to the upper bar section 251. The fourth beam segment 342 has one end distal from the third beam segment 341 and adapted to be connected removably to the second bar section 240. The rear beam 33 includes an upright beam segment 331 that has upper and lower ends, and a horizontal beam segment 332 that extends from the lower end of the upright beam segment 331. The rear beam 33 is spaced apart from the front beam 31 in the front-to-rear direction. The upper end of the upright beam segment 331 is connected to the first beam segment 321 of the first beam 32. The horizontal beam segment 332 has one end distal from the upright beam segment 331 and adapted to be connected to the second bar section 240. The guard member 35 is disposed above the front beam 31, extends in the left-to-right direction, and has opposite ends, each of which is adjacent to a respective one of the first and second beams 32, 34. At least one of the opposite ends of the guard member 35 is connected removably to the respective one of the first and second beams 32, 34.

Furthermore, the front, rear, first, and second beams 31, 33, 32, 34, and the guard member 35 are adapted to cooperate with the second bar section 240 and the upper bar section 251 of the vehicle body 2 to define a tank holding space 30 adapted for holding the fuel tank 200 therein. The fuel tank 200 is removable from the tank holding space 30 when the second beam 34 and the guard member 35 are detached from the tank holding frame 3.

In this embodiment, the fixing component 241 is adapted to be mounted on the second bar section 240. One end of the fourth beam segment 342 is inserted removably into the fixing component 241. The screw fasteners 343 are adapted for fastening removably the rear end of the third beam segment 341 to the upper bar section 251. The screw member 344 is for fastening removably the one end of the fourth beam segment 342 to the fixing component 241, and may be omitted in other embodiments of this invention. The reinforcing beam 36 extends in the front-to-rear direction and has opposite ends connected to the front and rear beams 31, 33, respectively. The cover 37 is connected to bottom sides of the front and rear beams 31, 33 and the reinforcing beam 36 and to bottom sides of the first and second bar sections 221, 240 so as to protect the fuel tank 200 stored in the tank holding space 30 from being struck by objects. The guard member 35 has a first guard part 351 spanning top sides of the first and second beams 32, 34, and a second guard part 352 transverse to the first guard part 351 and spanning front sides of the first and second beams 32, 34.

Hereinbelow is a description of some fastening schemes that can be employed for mounting the guard member 35 onto the first and second beams 32, 34. In one possible scheme, one of the opposite ends of the guard member 35 is welded to the second beam 34. The other one of the opposite ends of the guard member 35 is fastened to the first beam 32 by a screw 353 (see FIG. 4).

In another possible scheme, screws 353 (see FIG. 4) are used to fasten the opposite ends of the guard member 35 to the first and second beams 32, 34, respectively.

In still another possible scheme, one of the opposite ends of the guard member 35 is welded to the second beam 34. The other one of the opposite ends of the guard member 35 abuts removably against the first beam 32.

In yet another possible scheme, the screw 353 (see FIG. 4) is used to fasten one of the opposite ends of the guard member 35 to the second beam 34. The other one of the opposite ends of the guard member 35 abuts removably against the first beam 32.

When it is desired to remove the fuel tank 200, the rear end of the third beam segment 341 of the second beam 34 is removed from the upper bar section 251 by loosening the screw fasteners 343, while the one end of the fourth beam segment 342 of the second beam 34 is removed from the fixing component 241 on the second bar section 240 by loosening the screw member 344. The guard member 35 is detached from the tank holding frame 3 by loosening its connection with the first beam 32 without requiring disconnection of the guard member 35 from the second beam 34 such that the guard member 35 and the second beam 34 are removed from the tank holding frame 3 at the same time. As shown in FIG. 6, after detaching the second beam 34 and the guard member 35, the fuel tank 200 can then be lifted upward (as indicated by the arrow 4) and swung away from the left frame member 22 (as indicated by the arrow 5), thereby removing the fuel tank 200 from the tank holding space 30. Accordingly, in view of the detachable design of the second beam 34 and the guard member 35, the fuel tank 200 can be conveniently removed from the tank holding frame 3 of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A tank holding frame adapted for use on a vehicle body so as to retain a fuel tank removably therein, the vehicle body having a first bar section that extends in a front-to-rear direction, a second bar section that extends in the front-to-rear direction and that is spaced apart from the first bar section in a left-to-right direction, and an upper bar section that extends in the left-to-right direction and that is disposed above rear segments of the first and second bar sections, said tank holding frame comprising:

a front beam that is disposed to extend in the left-to-right direction and that has opposite ends adapted to be connected to front segments of the first and second bar sections such that said front beam is spaced apart from the upper bar section in the front-to-rear direction;

a first beam including a first beam segment that extends in the front-to-rear direction and that has front and rear ends, and a second beam segment that extends downwardly from said front end of said first beam segment, said first beam being adapted to be disposed adjacent to the first bar section, said rear end of said first beam segment being adapted to be connected to the upper bar section, said second beam segment having one end distal from said first beam segment and connected to said front beam;

a second beam including a third beam segment that extends in the front-to-rear direction and that has front and rear ends, and a fourth beam segment that extends downwardly from said front end of said third beam segment, said second beam being spaced apart from said first beam in the left-to-right direction, said rear end of said third beam segment being adapted to be connected removably to the upper bar section, said fourth beam segment having one end distal from said third beam segment and adapted to be connected removably to the second bar section;

a rear beam including an upright beam segment that has upper and lower ends, and a horizontal beam segment that extends from said lower end of said upright beam segment, said rear beam being spaced apart from said front beam in the front-to-rear direction, said upper end of said upright beam segment being connected to said first beam, said horizontal beam segment having one end distal from said upright beam segment and adapted to be connected to the second bar section; and a guard member that is disposed above said front beam, that extends in the left-to-right direction, and that has opposite ends, each of which is adjacent to a respective one of said first and second beams;

wherein at least one of said opposite ends of said guard member is connected removably to the respective one of said first and second beams;

wherein said front and rear beams, said first and second beams, and said guard member are adapted to cooperate with the second bar section and the upper bar section of the vehicle body to define a tank holding space adapted for holding the fuel tank therein, the fuel tank being removable from the tank holding space when said second beam and said guard member are detached from said tank holding frame.

2. The tank holding frame as claimed in claim 1, further comprising:

a fixing component adapted to be mounted on the second bar section, said one end of said fourth beam segment being inserted removably into said fixing component; and a screw fastener adapted for fastening removably said rear end of said third beam segment to the upper bar section.

3. The tank holding frame as claimed in claim 1, further comprising:

a fixing component adapted to be mounted on the second bar section;

a screw member for fastening removably said one end of said fourth beam segment to said fixing component; and a screw fastener adapted for fastening removably said rear end of said third beam segment to the upper bar section.

4. The tank holding frame as claimed in claim 1, further comprising a reinforcing beam that extends in the front-to-rear direction and that has opposite ends connected to said front and rear beams, respectively.

5. The tank holding frame as claimed in claim 4, further comprising a cover connected to bottom sides of said front and rear beams and said reinforcing beam.

6. The tank holding frame as claimed in claim 1, wherein one of said opposite ends of said guard member is welded to said second beam, said tank holding frame further comprising a screw for fastening the other one of said opposite ends of said guard member to said first beam.

7. The tank holding frame as claimed in claim 1, further comprising screws for fastening said opposite ends of said guard member to said first and second beams, respectively.

8. The tank holding frame as claimed in claim 1, wherein one of said opposite ends of said guard member is welded to said second beam, and the other one of said opposite ends of said guard member abuts removably against said first beam.

9. The tank holding frame as claimed in claim 1, further comprising a screw for fastening one of said opposite ends of said guard member to said second beam, the other one of said opposite ends of said guard member abutting removably against said first beam.

10. The tank holding frame as claimed in claim 1, wherein said guard member has a first guard part spanning top sides of said first and second beams, and a second guard part transverse to said first guard part and spanning front sides of said first and second beams.

* * * * *